B. FORD.
SECONDARY OR STORAGE BATTERY.
APPLICATION FILED APR. 22, 1908.
949,225.
Patented Feb. 15, 1910.
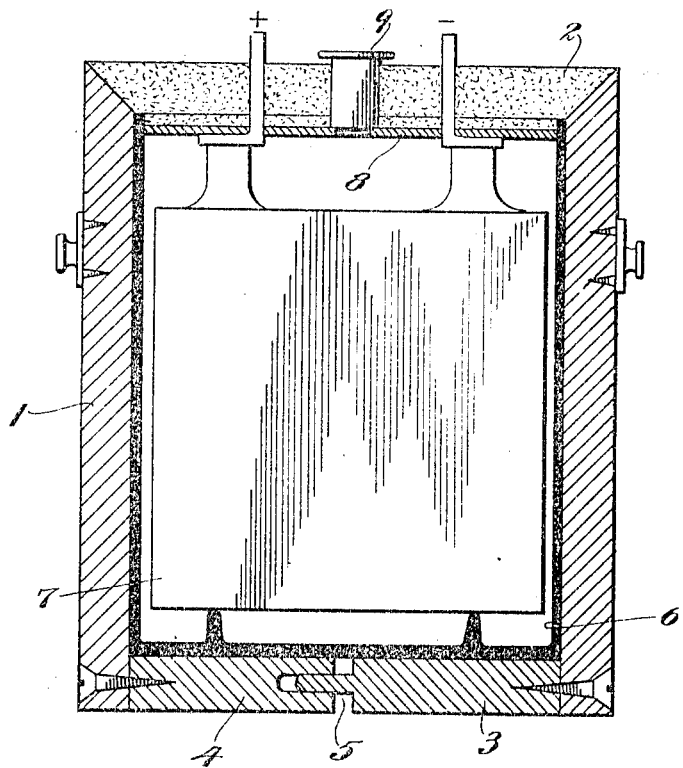

UNITED STATES PATENT OFFICE.

BRUCE FORD, OF PHILADELPHIA, PENNSYLVANIA.

SECONDARY OR STORAGE BATTERY.

949,225.  Specification of Letters Patent.  Patented Feb. 15, 1910.

Application filed April 22, 1908. Serial No. 428,596.

*To all whom it may concern:*

Be it known that I, BRUCE FORD, a citizen of the United States, and residing at Philadelphia, in the county of Philadelphia and State of Pennsylvania, have invented certain new and useful Improvements in Secondary or Storage Batteries, of which the following is a specification.

The principal object of the present invention is to improve the wooden boxes or cases of so-called portable storage batteries by increasing their durability in service, and to this end my invention, stated in general terms, consists in outwardly beveling the top edges of the side pieces of the box whereby their top surfaces are covered with and protected by the sealing compound, and it consists in providing an expansion joint in the bottom of the boxes which relieves them of strain, and it consists in the improvements to be described and finally claimed.

In the drawings I have illustrated, principally in central section, a so-called portable battery embodying features of the invention.

In the drawings 1, is a box or case made of wood. The top edges of its side walls are outwardly beveled or chamfered, and the sealing compound 2, overlies these beveled or chamfered edges and thus covers the top surfaces and protects the ends of the wood from acid or moisture which may escape from the battery. At the bottom of the box is an expansion joint 5, shown to consist of a tongue-and-groove connection between the parts 3 and 4. This joint by yielding prevents strains such as would be injurious and such as might come about by reason of shrinking, warping or swelling of the wooden bottom.

6, is a hard rubber jar which contains the plates 7, and the electrolyte.

8, is a cover provided with a vent 9 and which is sealed to place by the compound 2.

What I claim is—

1. In a storage battery the combination of an exterior box having the ends of its sides outwardly beveled or chamfered, a cover arranged beneath the ends, and a sealing compound overlying the cover and the chamfered or beveled ends of the sides to protect the latter, substantially as described.

2. A storage battery box having an expansion joint in its bottom, substantially as described.

3. A storage battery box having a tongue-and-groove expansion joint in its bottom, substantially as described.

4. A storage battery box having an expansion joint in its bottom and having the top edges of its side walls chamfered, substantially as described.

In testimony whereof I have hereunto signed my name.

BRUCE FORD.

Witnesses:
GEO. M. HOWARD,
EDGAR LONGAKER.